(12) United States Patent
Chen et al.

(10) Patent No.: US 11,016,337 B2
(45) Date of Patent: May 25, 2021

(54) LIGHT SOURCE MODULE AND DUAL DISPLAY DEVICE (71) Applicant: Coretronic Corporation, Hsin-Chu (TW)

(72) Inventors: Hui-Chuan Chen, Hsin-Chu (TW); Wen-Chin Tsai, Hsin-Chu (TW); Chung-Yang Fang, Hsin-Chu (TW); Yin-Jen Lin, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/660,831

(22) Filed: Oct. 23, 2019

(65) Prior Publication Data

US 2020/0133070 A1 Apr. 30, 2020

(30) Foreign Application Priority Data

Oct. 24, 2018 (CN) .......................... 201811241068.3

(51) Int. Cl.
*G02F 1/13363* (2006.01)
*G02F 1/13357* (2006.01)
(Continued)

(52) U.S. Cl.
CPC ...... *G02F 1/133603* (2013.01); *G02F 1/1334* (2013.01); *G02F 1/1396* (2013.01); *G02F 1/133524* (2013.01); *G02F 1/133528* (2013.01); *G02F 1/133605* (2013.01); *G02F 1/133606* (2013.01); *G02F 1/133615* (2013.01); *G02F 1/133636* (2013.01)

(58) Field of Classification Search
None
See application file for complete search history.

(56) References Cited

U.S. PATENT DOCUMENTS 8,899,815 B2 12/2014 Chen et al.
2004/0017529 A1* 1/2004 Choi ................. G02F 1/133605
349/114

(Continued)

FOREIGN PATENT DOCUMENTS

CN 104364703 A 2/2015
TW 200530695 A 9/2005
(Continued)

*Primary Examiner* — James A Dudek (57) ABSTRACT

A light source module includes a light guide plate, a light source and a light regulating element. The light guide plate has a first light emitting surface and a second light emitting surface, and a light incident surface connected between the first light emitting surface and the second light emitting surface. The second light emitting surface has a plurality of microstructures. The light source is disposed adjacent to the light incident surface. The light regulating element is disposed adjacent to the second light emitting surface. A dual display device including the light source module, a first display panel and a second display panel is also provided. The first display panel is disposed on a side of the light guide plate facing the first light emitting surface. The second display panel is disposed on a side of the light regulating element that is away from the light guide plate.

12 Claims, 10 Drawing Sheets (51) Int. Cl.
  *G02F 1/1334*  (2006.01)
  *G02F 1/1335*  (2006.01)
  *G02F 1/139*  (2006.01)

(56) References Cited

U.S. PATENT DOCUMENTS

| | | | |
|---|---|---|---|
| 2005/0041179 A1* | 2/2005 | Suzuki | G02F 1/133536 |
| | | | 349/74 |
| 2005/0206814 A1* | 9/2005 | Histake | G02F 1/13471 |
| | | | 349/112 |
| 2018/0210243 A1* | 7/2018 | Fang | G02B 6/0055 |

FOREIGN PATENT DOCUMENTS

| | | |
|---|---|---|
| TW | 200612146 A | 4/2006 |
| TW | I359996 B | 3/2012 |
| TW | 201407196 A | 2/2014 |
| TW | I575254 B | 3/2017 |
| TW | 201827894 A | 8/2018 |

\* cited by examiner

LIGHT SOURCE MODULE AND DUAL DISPLAY DEVICE

CROSS-REFERENCE TO RELATED APPLICATION

This application claims the priority benefit of China application CN201811241068.3, filed on Oct. 24, 2018. The entirety of the above-mentioned patent application is hereby incorporated by reference herein and made a part of this specification.

FIELD OF THE INVENTION

The present invention relates to a light source module, and more particularly to a light source module capable of dual side illumination and a dual display device using the same.

BACKGROUND OF THE INVENTION

A liquid crystal display panel of a liquid crystal display device does not emit light, so a surface light source needs to be provided by a backlight module. The backlight module includes a direct type backlight module and a edge type backlight module. A current common direct type backlight module is to dispose a plurality of LEDs arranged in a two-dimensional array under a diffusion plate. However, although the direct type backlight module has better brightness uniformity, there are disadvantages of thicker thickness.

The current edge type backlight module has a thinner thickness than the direct type backlight module because a light emitting diode (LED) light bar is disposed on a side of a light guide plate. However, the edge type backlight module in the prior art is paired with a light guide plate and a light source. If the screens have different brightness requirements in a dual liquid crystal display device, for example, one side is placed outside the room and its brightness needs to be increased, and the other side is placed in the room and its brightness needs to be relatively lowered, two sets of backlight modules are needed at the time, which increases the size and weight of the dual liquid crystal display device.

If the transmittance of the display panel is adjusted, the dual side screen with different brightness can be achieved with a single side edge backlight module. However, in this case, the brightness of the light emitted from both sides of the backlight module is fixed, and it is impossible to perform another regulation, which is easy to consume energy.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module for adjusting the brightness of the light emitted from both sides.

The invention provides a dual display device for adjusting the brightness of the light emitted from both sides of the light source module to both sides of the display panel, and has the advantages of thinner thickness and lighter weight.

Other advantages and objects of the invention may be further illustrated by the technical features broadly embodied and described as follows.

In order to achieve one or a portion of or all of the objects or other objects, a light source module provided in an embodiment of the invention includes a light guide plate, a light source and a light regulating element. The light guide plate has a first light emitting surface and a second light emitting surface opposite to each other, and a light incident surface connected between the first light emitting surface and the second light emitting surface. The second light emitting surface has a plurality of microstructures. The light source is disposed adjacent to the light incident surface, and is configured to emit a light to enter the light guide plate through the light incident surface. The light regulating element is disposed adjacent to the second light emitting surface, and is configured to receive the light and regulate a reflectance of the light regulating element for the light.

In order to achieve one or a portion of or all of the objects or other objects, a dual display device provided in an embodiment of the invention includes a first display panel, a second display panel, and the above-mentioned light source module. The first display panel is disposed on a side of the light guide plate facing the first light emitting surface. The second display panel is disposed on a side of the light regulating element that is away from the light guide plate.

The light source module of the invention includes a light guide plate capable of emitting light on both sides and a light regulating element, and the light regulating element is configured to receive the light and regulate the reflectance of the light regulating element for the light. Therefore, when a single light source is used in the light source module, the brightness of the light emitted on both sides can be adjusted according to the design requirements, so that the brightness of the double-sided is the same or different. Since the dual display device of the invention uses the above-mentioned light source module, the light emitted from the light source module toward the first display panel and the second display panel can have different brightness according to design requirements. Since only one set of light source module is used, it has the advantages of thinner thickness and lighter weight.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
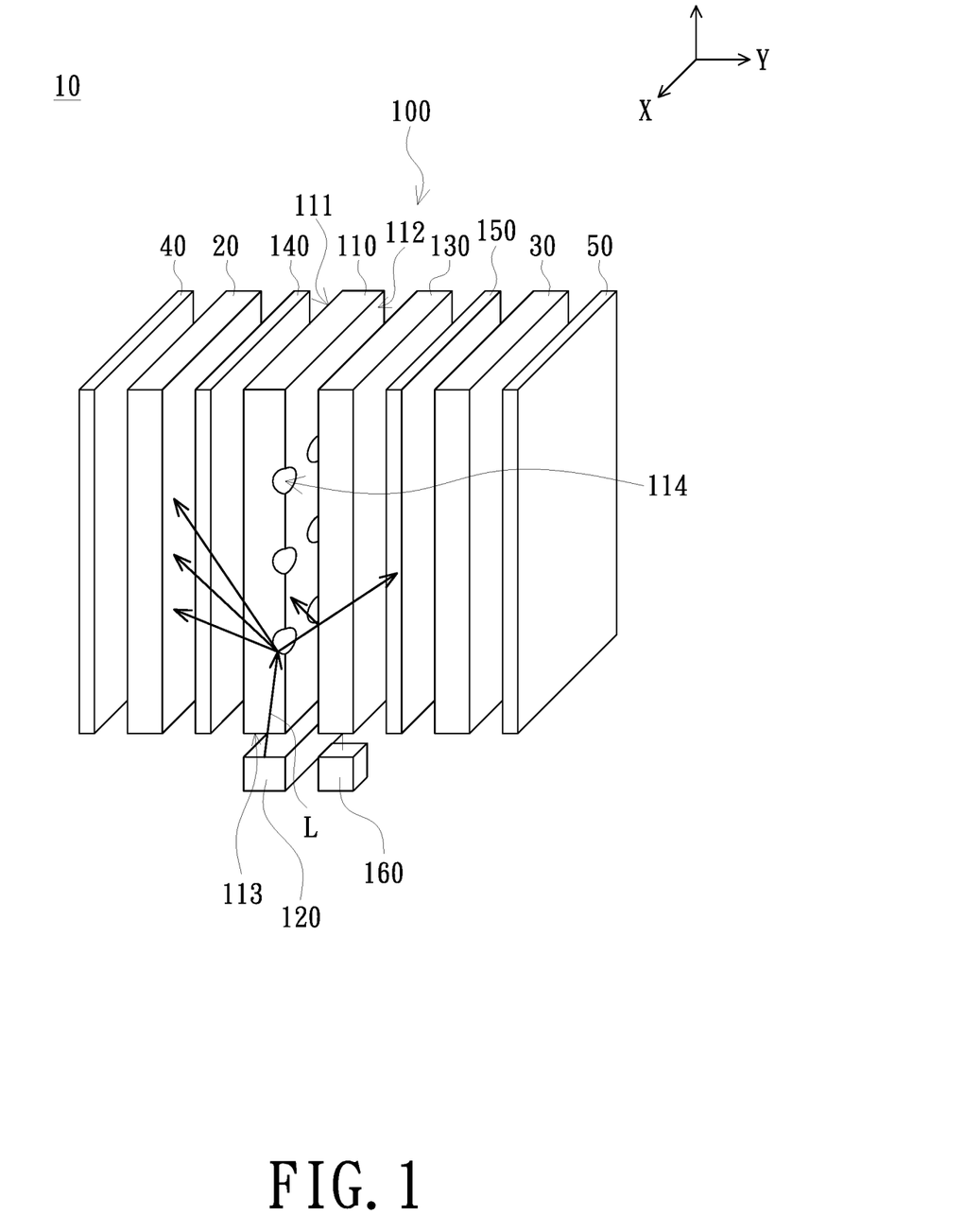
FIG. 1 is a schematic cross-sectional view of a dual display device of one embodiment of the invention.

FIG. 1 is a schematic cross-sectional view of a dual display device of one embodiment of the invention. Referring to FIG. 1, a dual display device 10 of the embodiment includes a light source module 100, a first display panel 20 and a second display panel 30, and the first display panel 20 and the second display panel 30 are respectively disposed on two sides of the light source module 100.

The light source module 100 includes a light guide plate 110, a light source 120 and a light regulating element 130. The light guide plate 110 has a first light emitting surface 111, a second light emitting surface 112 opposite to first light emitting surface 111, and a light incident surface 113 connected between the first light emitting surface 111 and the second light emitting surface 112. The second light emitting surface 112 has a plurality of microstructures 114. The quantity and shape of the microstructures 114 are not particularly limited, and FIG. 1 is schematically illustrated by six dot-like microstructures 114. The microstructures 114 are, for example, evenly distributed on the second light emitting surface 112. In another embodiment, the microstructures 114 may also be unevenly distributed on the second light emitting surface 112. The light source 120 is disposed adjacent to the light incident surface 113, and is configured to emit a light L to enter the light guide plate 110 through the light incident surface 113. The light regulating element 130 is configured to receive the light L and regulate a reflectance the light regulating element 130 for the light L. The light regulating element 130 of the embodiment is disposed, for example, adjacent to the second light emitting surface 112, but is not limited thereto. The light regulating element 130 may be disposed adjacent to the first light emitting surface 111, or one light regulating element 130 is disposed adjacent to the first light emitting surface 111 and another light regulating element 130 is disposed adjacent to the second light emitting surface 112.

The light source module 100 further includes, for example, a first optical film 140 and a second optical film 150. The first optical film 140 and the second optical film 150 are, for example, a brightness enhancement film or a diffusion film, but are not limited thereto. The first optical film 140 is disposed, for example, adjacent to the first light emitting surface 111. The second optical film 150 is disposed, for example, adjacent to the second light emitting surface 112. The light regulating element 130 of the embodiment is disposed, for example, between the light guide plate 110 and the second optical film 150, that is, the second optical film 150 is disposed on the side of the light regulating element 130 away from the second light emitting surface 112. However, the light regulating element 130 may be disposed between the second optical film 150 and the second display panel 30 according to different design requirements.

When the light L is incident on the microstructures 114, part of the light L is reflected and emitted from the first light emitting surface 111, and part of the light L is refracted and emitted from the second light emitting surface 112, and thereby achieving the effect of the light emitted from dual side. When the light L is emitted from the second light emitting surface 112 of the light guide plate 110 and transmitted to the light regulating element 130, the light regulating element 130 can regulate the reflectance of the light regulating element 130 for the light L, such as total reflection, semi-reflection/semi-transmission or total transmission, but is not limited thereto. The reflectance can be, for example, adjusted between total reflection and total transmission. In the embodiment, when the reflectance of the light regulating element 130 for the light L is total reflection, the brightness of the light emitted from the light source module 100 facing the first display panel 20 may be greater than the brightness of the light emitted from the light source module 100 facing the second display panel 30; and when the reflectance of the light regulating element 130 for the light L is total transmission, the brightness of the light emitted from the light source module 100 facing the first display panel 20 may be approximately equal to the brightness of the light emitted from the light source module 100 facing the second display panel 30.

In the embodiment, the light source 120 is, for example, a linear light source including a plurality of point light sources, wherein the point light sources are, for example, light emitting diodes (LEDs), but not limited thereto. The light source 120 may also be other types of linear light sources, such as light tubes, and the invention does not limit the type of the light source.

In the embodiment, the first display panel 20 and the second display panel 30 are, for example, a liquid crystal display panel, but is not limited thereto. In other embodiment, the type of the liquid crystal display panel is, for example, a transmissive display panel or a semi-reflective/semi-transmissive display panel.

The light source module 100 of the embodiment includes a light guide plate 110 capable of emitting light L on dual side and a light regulating element 130, and the light regulating element 130 is configured to receive the light L and regulate the reflectance of the light regulating element 130 for the light L. Therefore, even if the light source module 100 is a single light source, the respective brightness of the emitting surfaces of the light source module 100 can be adjusted according to the design requirements, so that the brightness of the emitting surfaces of the light source module 100 are the same or different. Since the dual display device 10 of the invention uses the above-mentioned light source module 100, the different brightness lights emitted from the light source module 100 toward the first display panel 20 and the second display panel 30 according to design requirements. Since only one set of light source module 100 is used, it has the advantages of thinner thickness and lighter weight.

The dual display device 10 of the embodiment may further include a first cover sheet 40 and a second cover sheet 50. The first cover sheet 40 faces the first display panel 20 and is disposed on a side of the first display panel 20 away from the light source module 100. The second cover sheet 50 faces the second display panel 30 and is disposed on a side of the second display panel 30 away from the light source module 100. The first cover sheet 40 and the second cover sheet 50 are, for example, a cover glass for providing dustproof and protective functions.

Figure 2:
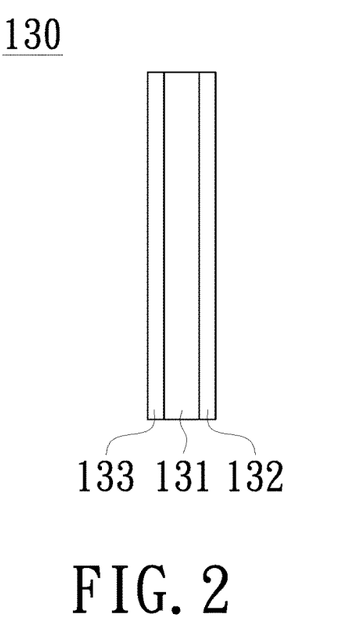
FIG. 2 is a schematic cross-sectional view of a light regulating element of one embodiment of the invention.

Regarding the principle of the light regulating element 130 regulating the reflectance of the light regulating element 130 for the light L, various embodiments will be described below. FIG. 2 is a schematic cross-sectional view of a light regulating element of one embodiment of the invention. Referring to FIG. 1 and FIG. 2, the light regulating element 130 of the embodiment includes a liquid crystal panel 131, a first polarizing film 132, and a second polarizing film 133. The first polarizing film 132 is disposed on a side of the liquid crystal panel 131 away from the light guide plate 110, and the second polarizing film 133 is disposed on the other side of the liquid crystal panel 131 facing the light guide plate 110. The first polarizing film 132 has a first transmission axis (not shown) to allow a light in a direction parallel to a polarization direction of the first transmission axis to pass therethrough and to reflect a light in a direction non-parallel to the polarization direction of the first transmission axis. Specifically, the first polarizing film 132 is, for example, a reflective polarizer. The second polarizing film 133 has a second transmission axis (not shown) to allow a light in a direction parallel to the polarization direction of the second transmission axis to pass therethrough. Specifically, the second polarizing film 133 may be, for example, a reflective polarizer or an absorptive polarizer.

Since the liquid crystal panel 131 has liquid crystal molecules, an electric field for the liquid crystal molecules is formed when a voltage is applied, and the alignment direction of the liquid crystal molecules can be adjusted by adjusting the voltage, so that the reflectance of the light regulating element 130 can be regulated by adjusting the percentage of the light regulating element 130 between the transmissive mode and the reflective mode. When the light regulating element 130 is in the transmissive mode, an external light incident to the second polarizing film 133 (for example, a light emitted from the light guide plate 110 toward the second polarizing film 133) may pass through the first polarizing film 132. When the light regulating element 130 is in the reflective mode, an external light incident to the second polarizing film 133 is reflected by the first polarizing film 132. Therefore, the light regulating element 130 can adjust the respective brightness of the emitting surfaces of the light source module 100.

Figure 3A:
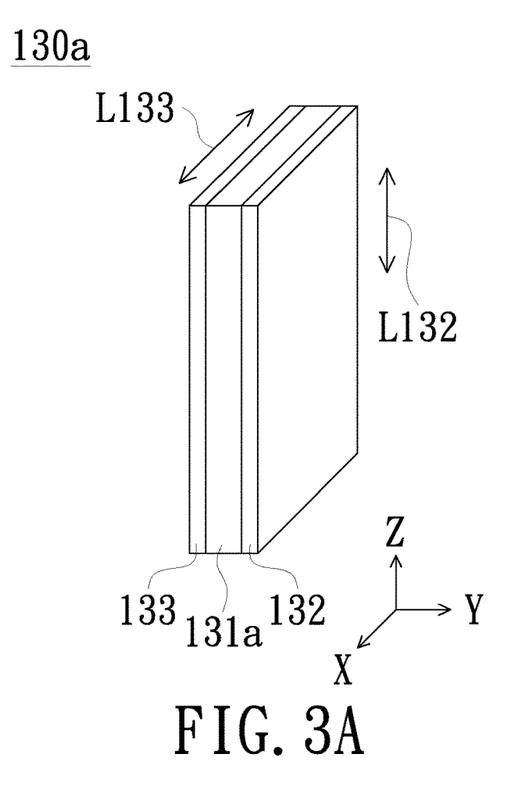
FIG. 3A is a schematic cross-sectional view of a light regulating element of another embodiment of the invention.
Figure 3B:
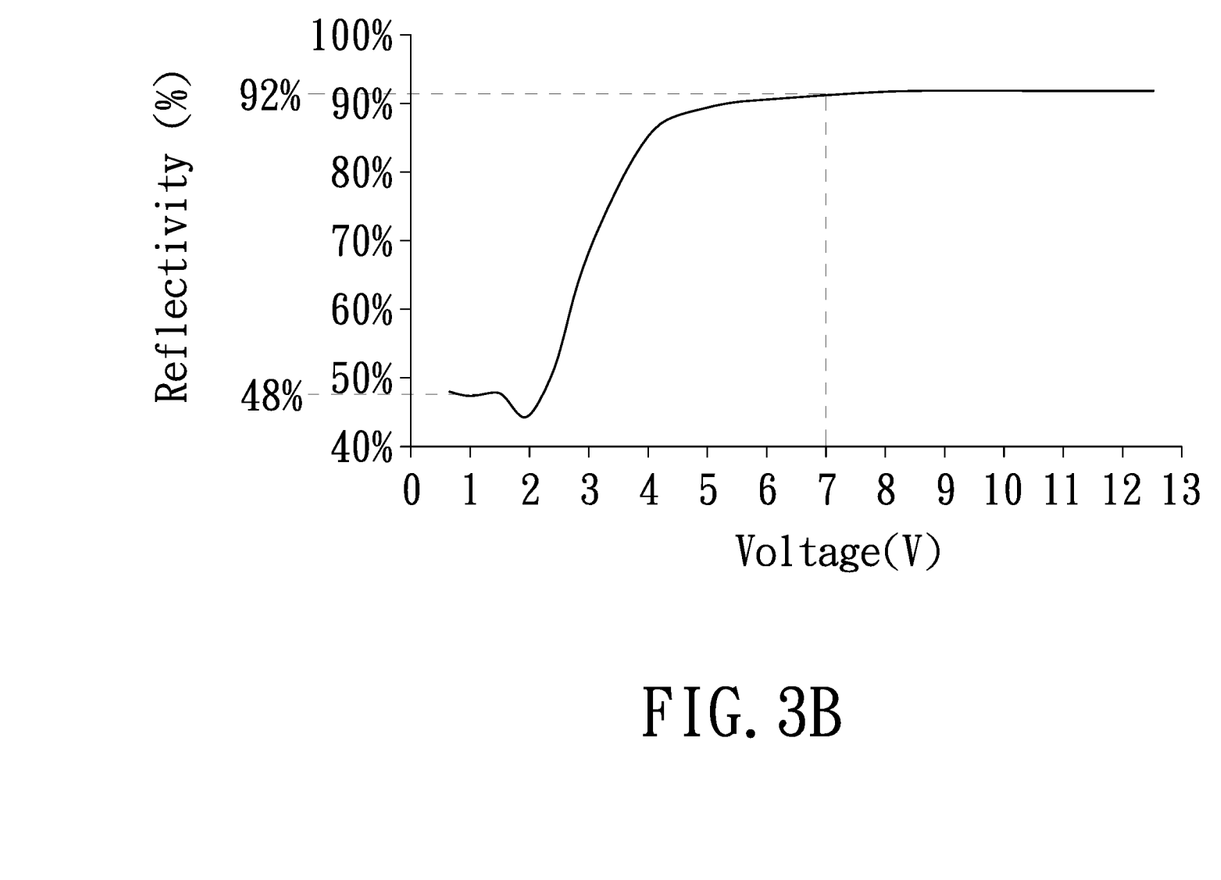
FIG. 3B is a schematic diagram showing the relationship between a voltage and a reflectance of a light regulating element of one embodiment of the invention.

The liquid crystal panel 131 can be further classified into, for example, a twisted nematic liquid crystal panel and a birefringence liquid crystal panel depending on the arrangement of the liquid crystal. FIG. 3A is a schematic cross-sectional view of a light regulating element of another embodiment of the invention. Referring to FIG. 1 and FIG. 3A, the light regulating element 130a of the embodiment is similar in structure to the light regulating element 130. The liquid crystal panel 131 is, for example, a twisted nematic liquid crystal panel 131a, and a first transmission axis L132 of the first polarizing film 132 is substantially parallel or perpendicular to a second transmission axis L133 of the second polarizing film 133. In FIG. 3A, the first transmission axis L132 and the second transmission axis L133 are perpendicular to each other as an example, wherein the axial direction of the first transmission axis L132 is, for example, parallel to the axial direction Z, and the axial direction of the second transmission axis L133 is, for example, parallel to the axial direction X. Taking the embodiment as an example, when the light regulating element 130a is regulated by voltage, the reflectance is adjusted, for example, between 48% and 92%, as shown in FIG. 3B.

Figure 4A:
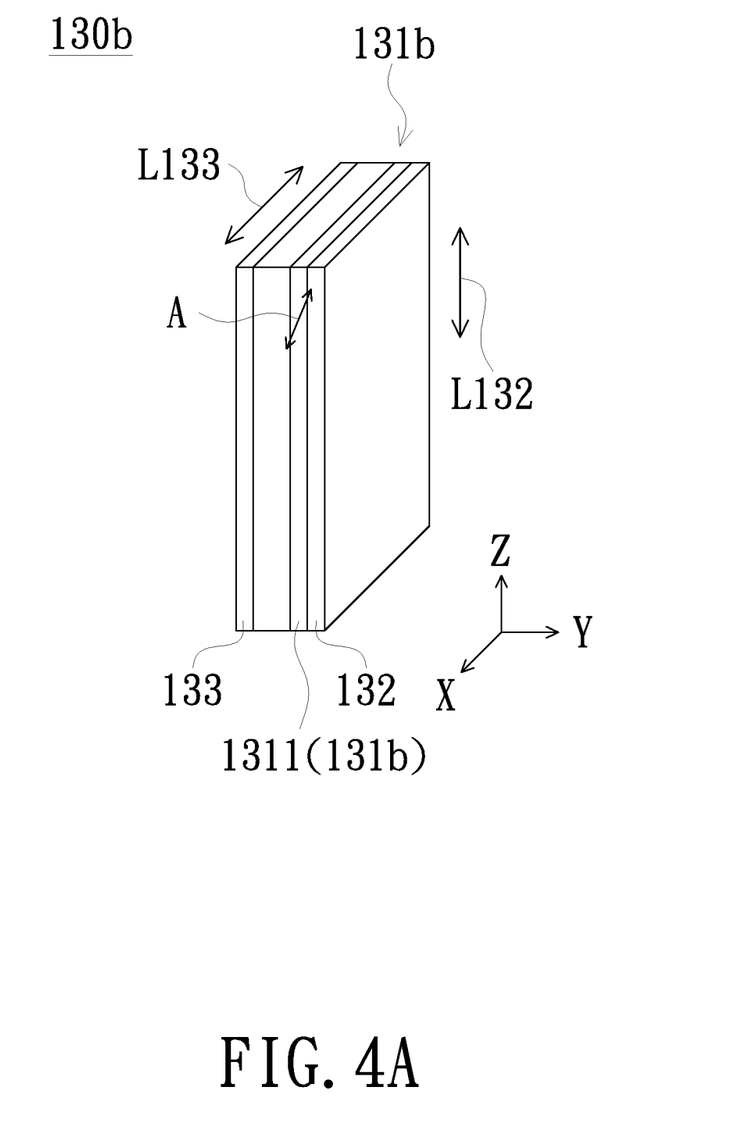
FIG. 4A to FIG. 4D is a schematic cross-sectional view of a light regulating element of another embodiment of the invention.
Figure 4B:
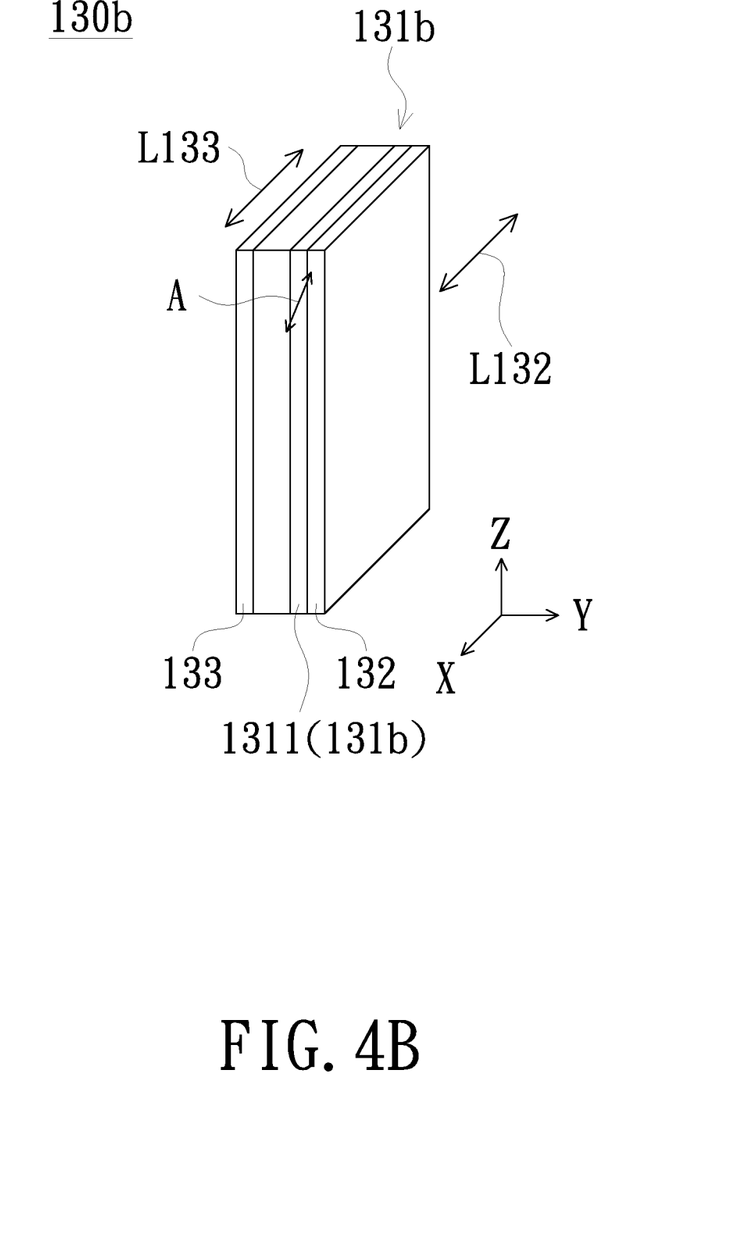
Figure 4C:
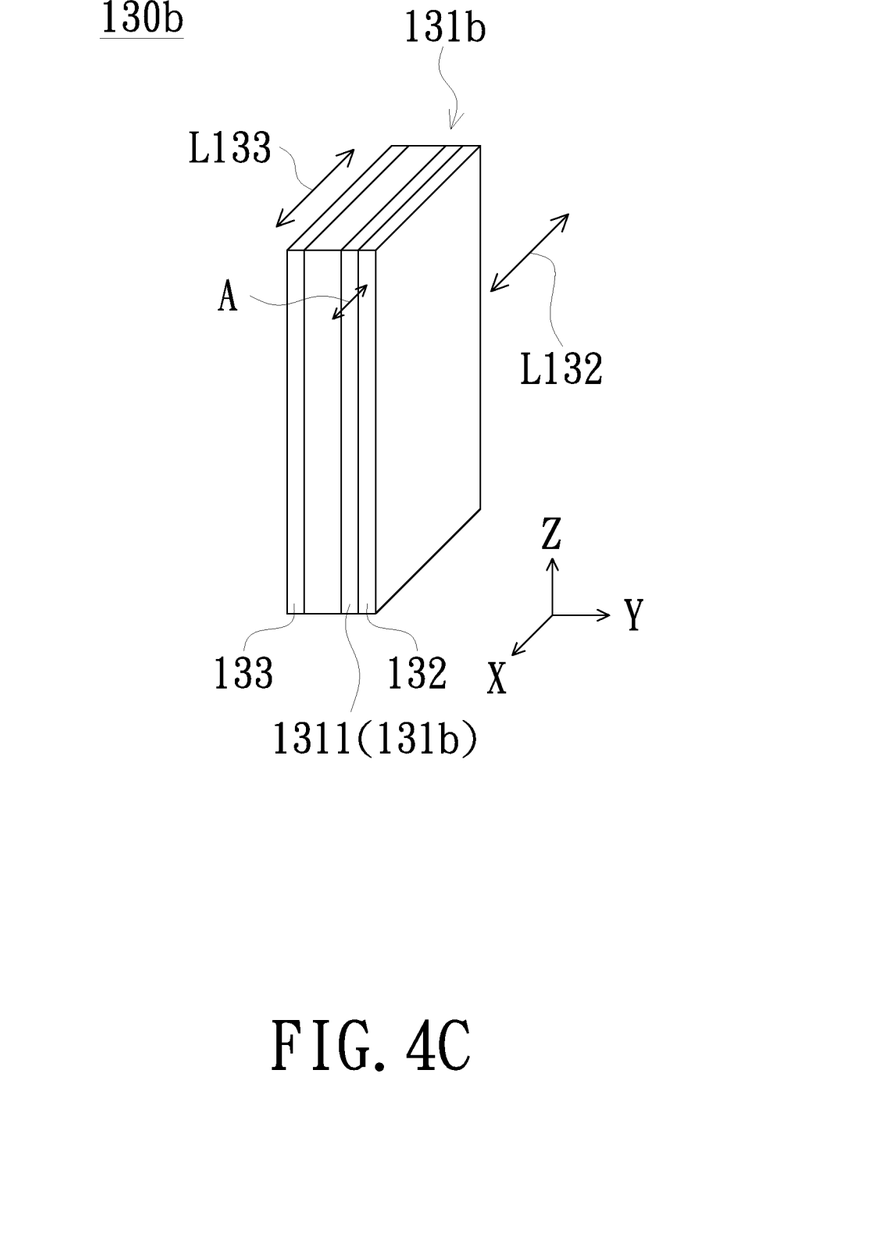
Figure 4D:
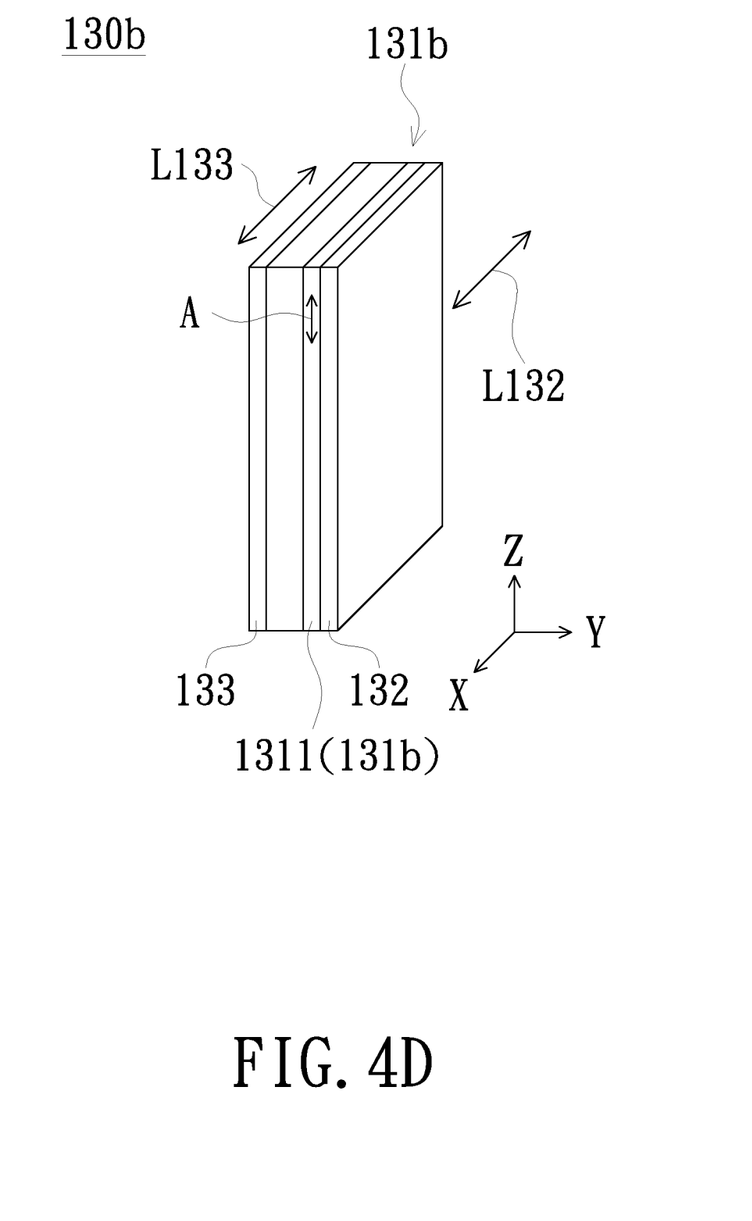

FIG. 4A to FIG. 4D is a schematic cross-sectional view of a light regulating element of another embodiment of the invention. Referring to FIG. 1, FIG. 2 and FIG. 4A to FIG. 4D, the light regulating element 130b of the embodiment is similar in structure to the light regulating element 130. The liquid crystal panel 131 is, for example, a birefringence liquid crystal panel 131b and has at least one alignment layer 1311. The quantity of alignment layer 1311 of the embodiment is one, and the alignment layer 1311 is disposed on a side of the birefringence liquid crystal panel 131b facing the first polarizing film 132. In other embodiments, the quantity of the alignment layer 1311 may be two, and the two alignment layers 1311 are respectively disposed on a side of the birefringence liquid crystal panel 131b facing the first polarizing film 132 and a side of the birefringence liquid crystal panel 131b facing the second polarizing film 133. At least one alignment layer 1311 has an alignment direction A. The first transmission axis L132 is substantially parallel or perpendicular to the second transmission axis L133. In FIG. 4A, the first transmission axis L132 is perpendicular to the second transmission axis L133 as an example, the axial direction of the first transmission axis L132 is, for example, parallel to the axial direction Z, and the axial direction of the second transmission axis L133 is, for example, parallel to the axial direction X. In FIG. 4B to FIG. 4D, the first transmission axis L132 is parallel to the second transmission axis L133 as an example, and the axial direction of the first transmission axis L132 and the axial direction of the second transmission axis L133 are, for example, parallel to the axial direction X. The alignment direction A may be substantially at 45 degrees (as shown in FIG. 4A, FIG. 4B), parallel (as shown in FIG. 4C) or perpendicular (as shown in FIG. 4D) to the first transmission axis L132.

Compared with the twisted nematic liquid crystal panel 131a, the birefringence liquid crystal panel 131b has higher reflection characteristics at a larger angle of view, and a preferred angle of view of light reflection is, for example, 70 degrees. When the light regulating element 130 is disposed between the light guide plate 110 and the second optical film 150, most of the light emitted from the light guide plate 110 is emitted at a large angle, and therefore, the birefringence liquid crystal panel 131b can reflect more light than the twisted nematic liquid crystal panel 131a. In other words, when the light regulating element 130 is disposed between the second optical film 150 and the second display panel 30, most of the light passing through the second optical film 150 is directed to be emitted forward (i.e., the viewing angle is narrower). Therefore, the twisted nematic liquid crystal panel 131a can reflect more light than the birefringence liquid crystal panel 131b. In addition, when the light regulating element 130 including the birefringence liquid crystal panel 131b is disposed between the second optical film 150 and the second display panel 30, the alignment direction A can also be at a 45 degrees to the first transmission axis L132, thereby achieving a better effect of regulating the forward reflectance of the light regulating element 130.

Figure 5:
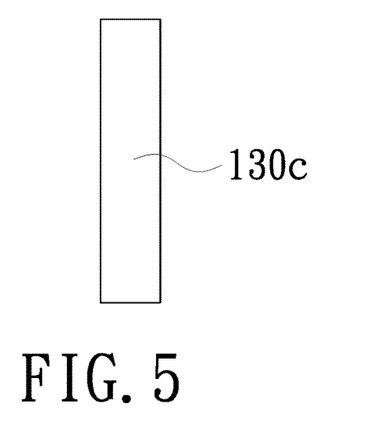
FIG. 5 is a schematic cross-sectional view of a light regulating element of another embodiment of the invention.

FIG. 5 is a schematic cross-sectional view of a light regulating element of another embodiment of the invention. Referring to FIG. 1 and FIG. 5, the light regulating element 130c of the embodiment has similar advantages to the light regulating element 130. The light regulating element 130c is, for example, a cholesteric liquid crystal panel. The liquid crystal molecules in the cholesteric liquid crystal panel are arranged in a spiral shape, that is, a "spiral structure" is formed. When a voltage is applied to the light regulating element 130c for regulating, the axial direction of the spiral structure changes accordingly to reflect the light or allow the light to pass therethrough. From the appearance, the cholesteric liquid crystal panel is mirror-like in the reflective mode, transparent in the transmissive mode, and translucent when the reflectance is between the two.

Figure 6:
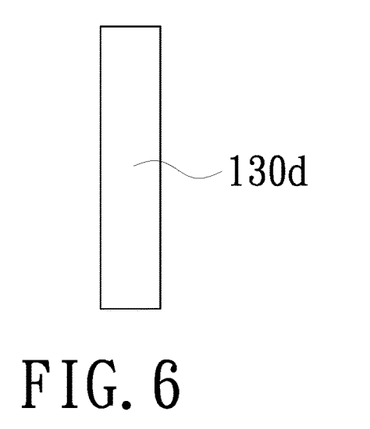
FIG. 6 is a schematic cross-sectional view of a light regulating element of another embodiment of the invention.

FIG. 6 is a schematic cross-sectional view of a light regulating element of another embodiment of the invention. Referring to FIG. 1 and FIG. 6, the light regulating element 130d of the embodiment has similar advantages to the light regulating element 130. The light regulating element 130d is, for example, a polymer-dispersed liquid crystal (PDLC) film. The alignment direction of liquid crystal molecules in the polymer dispersed liquid crystal film can be changed by voltage regulation, so that the polymer dispersed liquid crystal film can be used to reflect the light or allow the light to pass therethrough. When the light is reflected, an atomization state is exhibited due to the difference in refractive index between the liquid crystal molecules and the high molecular polymer. When the light passes through, since the alignment directions of the liquid crystal molecules are uniform, the refractive index of the liquid crystal molecules and the polymer are the same, and a transparent state is exhibited.

Figure 7:
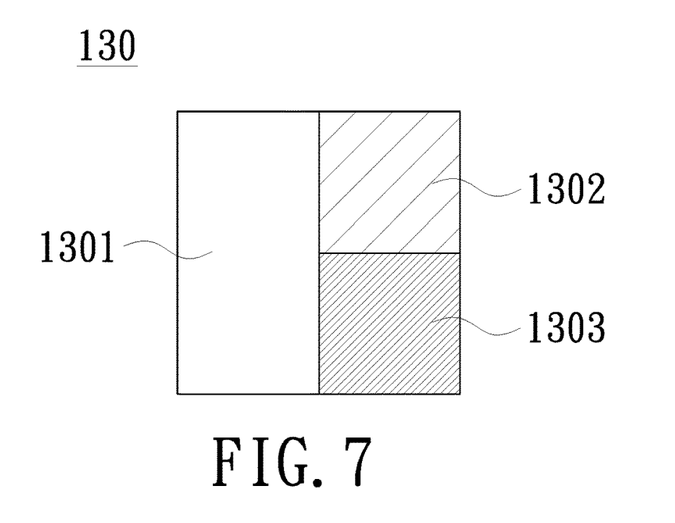
FIG. 7 is a schematic diagram showing light regulating elements of the invention having different reflectance.

FIG. 7 is a schematic diagram showing light regulating elements of the invention having different reflectance. Referring to FIG. 1 and FIG. 7, the light source module 100 further includes, for example, a control unit 160. The control unit 160 is electrically connected to, for example, the light regulating element 130 and divides it into a plurality of regions, and can individually regulate the plurality of regions to have the same or different reflectance. There is no special limit to the quantity and size of the plurality of regions. Take FIG. 7 as an example, the light regulating element 130 is divided into regions 1301, 1302, 1303, in which the reflectance is indicated by the color depth, and the darker the color, the higher the reflectance to the light. Therefore, the relationship of the reflectance of the plurality of regions in FIG. 7 is: region 1303>region 1302>region 1301.

By different reflectances of the plurality of regions, the light regulating element 130 can cause the light source module 100 to achieve a dynamic local dimming function, thereby exhibiting a high dynamic range (HDR) effect on the display panel of the dual display device 10. The light regulating element 130 can also be replaced with the light regulating elements 130a, 130b, 130c, 130d of any of the above embodiments.

Figure 8:
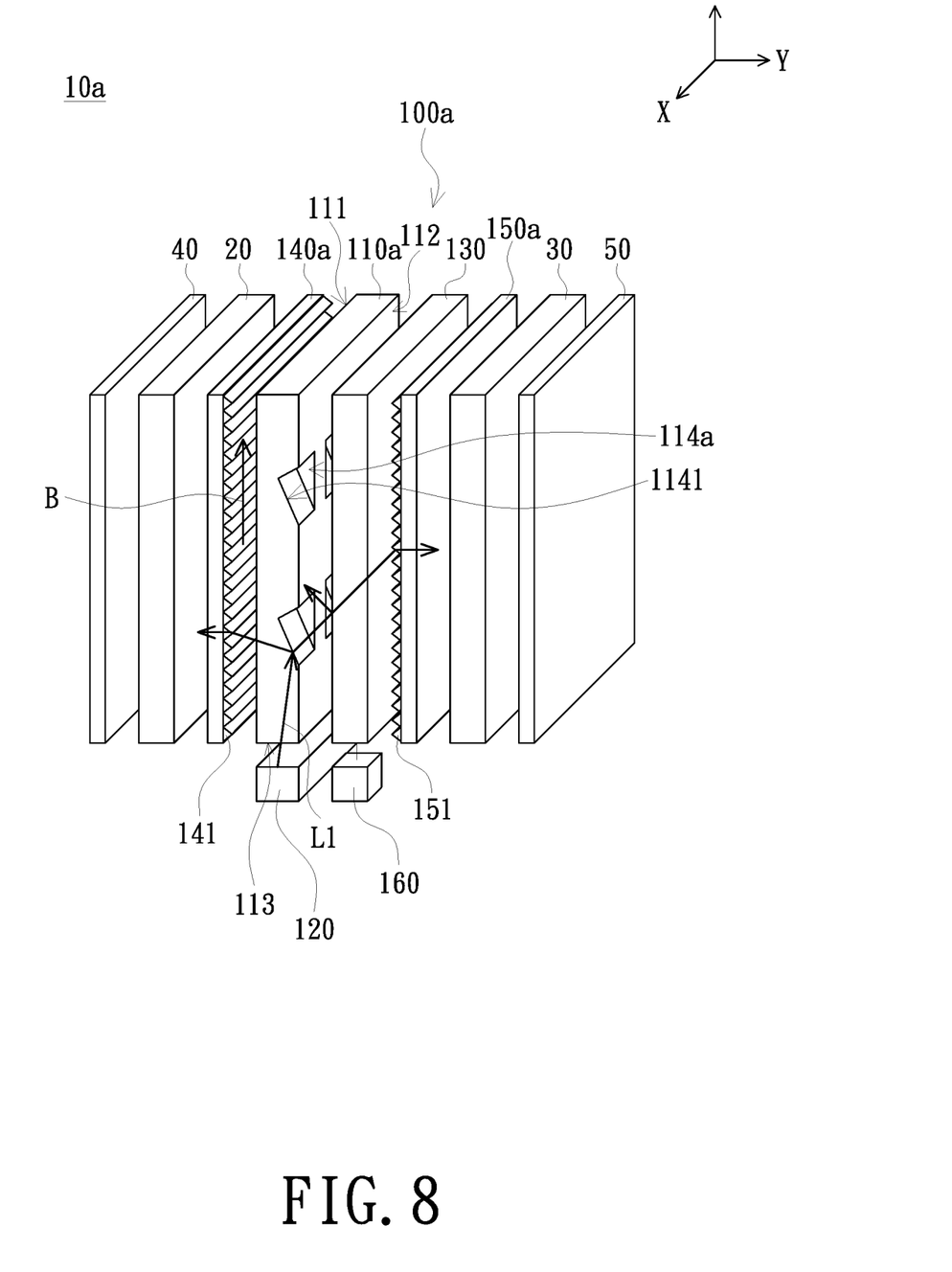
FIG. 8 is a schematic cross-sectional view of a dual display device of another embodiment of the invention.

FIG. 8 is a schematic cross-sectional view of a dual display device of another embodiment of the invention. Referring to FIG. 8, the dual display device 10a of the embodiment is similar in structure and advantages to the dual display device 10, and the main differences of the structure are illustrated below. In the dual display device 10a of the embodiment, each of the microstructures 114a is, for example, a concave structure (only four microstructures are shown in FIG. 8). The concave structure has a first surface 1141 inclined with respect to the second light emitting surface 112, and the first surface 1141 faces the light incident surface 113. In another embodiment, each of the microstructures 114a may also be a convex structure having a first surface 1141 inclined with respect to the second light emitting surface 112, and the first surface 1141 faces away from the light incident surface 113. In other embodiments, the microstructures 114a may also be a combination of partial of concave structures and partial of convex structures, and the invention is not limited thereto. The first optical film is, for example, a first reverse prism sheet 140a, and includes a plurality of first prism pillars 141. The first prism pillars 141 are arranged along a predetermined direction B from the light incident surface 113 toward away from the light incident surface 113, in which the predetermined direction B is, for example, parallel to the axial direction Z, and the first prism pillars 141 face the first light emitting surface 111. The second optical film is, for example, a second reverse prism sheet 150a including a plurality of second prism pillars 151, the second prism pillars 151 are arranged along the predetermined direction B, and the second prism pillars 151 face the second light emitting surface 112. The first prism pillars 141 and the second prism pillars 151 extend, for example, along the axial direction X. When the light L1 is incident on the microstructure 114a, part of the light is reflected and emitted from the first light emitting surface 111, and part of the light is refracted to be emitted from the second light emitting surface 112, and the first reverse prism sheet 140a and the second reverse prism sheet 150a can converge the light to enhance the brightness of the light emitted from the light source module 100a.

The light regulating element 130 can also be replaced with the light regulating elements 130a, 130b, 130c, 130d of any of the above embodiments. In addition, the light L1 emitted from the second light emitting surface 112 at a large angle, and it is not converged by the second reverse prism sheet 150a. Therefore, in the embodiment of the light regulating element 130a (twisted nematic liquid crystal panel 131a) and the light regulating element 130b (birefringence liquid crystal panel 131b), the light regulating element 130b has a better reflection effect than the light regulating element 130a.

Figure 9:
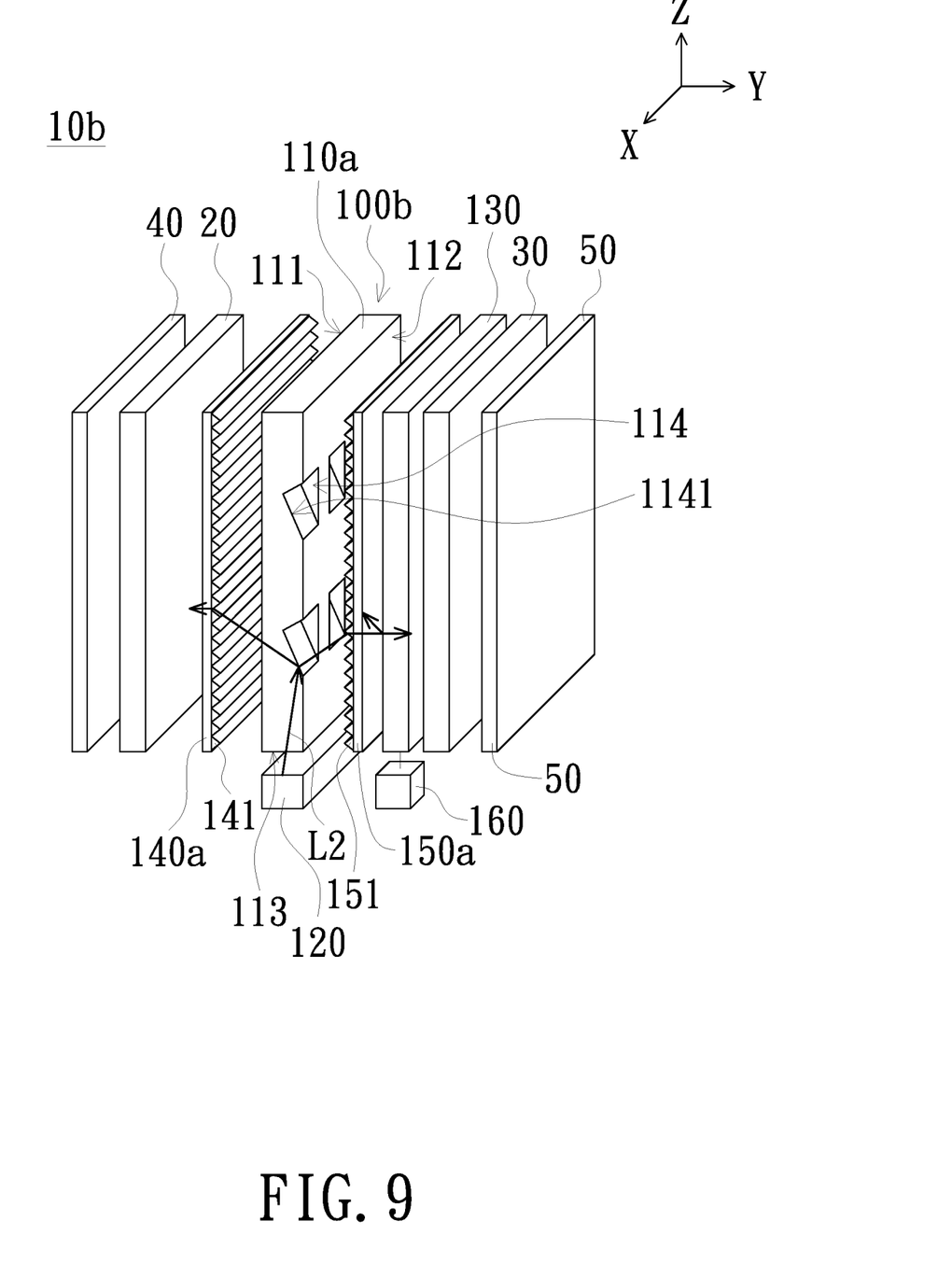
FIG. 9 is a schematic cross-sectional view of a dual display device of another embodiment of the invention.

FIG. 9 is a schematic cross-sectional view of a dual display device of another embodiment of the invention. Referring to FIG. 9, the dual display device 10b of the embodiment is similar in structure and advantages to the dual display device 10a, except that the second reverse prism sheet 150a (second optical film) is disposed between the second light emitting surface 112 and the light regulating element 130. The light regulating element 130 can also be replaced with the light regulating elements 130a, 130b, 130c, 130d of any of the above embodiments. Since the light L2 emitted from the second light emitting surface 112 is converged by the second reverse prism sheet 150a before transmitted to the light regulating element 130, in the embodiment of the light regulating element 130a (twisted nematic liquid crystal panel 131a) and the light regulating element 130b (birefringence liquid crystal panel 131b), the light regulating element 130a has a better reflection effect than the light regulating element 130b.

The configured position of light regulating elements 130, 130a, 130b, 130c, 130d in light source modules 100, 100a, 100b and the reflection effect of the light regulating elements 130, 130a, 130b, 130c, 130d are not limited to a specific combination, but only shows that the dual display device 10 can select different light regulating element according to different design requirements to adjust the brightness of the light emitted from the first display panel 20 and the second display panel 30.

In summary, the light source module of the embodiment of the invention includes a light guide plate capable of emitting light on dual side and a light regulating element, and the light regulating element is configured to receive the light and regulate the reflectance of the light regulating element 130 for the light. Therefore, when a single light source is used in the light source module, the brightness of the light emitted on dual side can be adjusted according to the design requirements, so that the brightness of the dual side is the same or different. Since the dual display device of the invention uses the above-mentioned light source module, the light emitted from the first display panel and the second display panel can have different brightness according to design requirements. Since only one set of light source module is used, it has the advantages of thinner thickness and lighter weight.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first display panel, the second display panel, the first cover sheet, the second cover sheet, the first light emitting surface, the second light emitting surface, the first surface, the first polarizing film, the second polarizing film, the first optical film, the second optical film, the first reverse prism sheet, the second reverse prism sheet, the first prism pillar, the second prism pillar, the first transmission axis and the second transmission axis are only used for distinguishing various elements and do not limit the number of the elements.

What is claimed is:

1. A light source module, comprising a light guide plate, a light source and a light regulating element, wherein:
    the light guide plate has a first light emitting surface and a second light emitting surface opposite to each other and a light incident surface connected between the first light emitting surface and the second light emitting surface, and the second light emitting surface has a plurality of microstructures;
    the light source is disposed adjacent to the light incident surface and configured to emit a light to enter the light guide plate through the light incident surface; and
    the light regulating element is disposed adjacent to the second light emitting surface and configured to receive the light and regulate a reflectance of the light regulating element for the light,
    wherein the light regulating element comprises a liquid crystal panel, a first polarizing film, and a second polarizing film, the first polarizing film is disposed on a side of the liquid crystal panel away from the light guide plate, the second polarizing film is disposed on the other side of the liquid crystal panel facing the light guide plate, the first polarizing film has a first transmission axis to allow a light in a direction parallel to a polarization direction of the first transmission axis to pass therethrough and to reflect a light in a direction non-parallel to the polarization direction of the first transmission axis, and the second polarizing film has a second transmission axis to allow a light in a direction parallel to the polarization direction of the second transmission axis to pass therethrough.

2. The light source module according to claim 1, wherein the liquid crystal panel is a twisted nematic liquid crystal panel, and the first transmission axis is parallel or perpendicular to the second transmission axis.

3. The light source module according to claim 1, wherein the liquid crystal panel is a birefringence liquid crystal panel and has at least one alignment layer, the at least one alignment layer has an alignment direction, the first transmission axis is parallel or perpendicular to the second transmission axis, and the first transmission axis is parallel or perpendicular to the alignment direction, or has an 45 degrees included angle with the alignment direction.

4. The light source module according to claim 3, further comprising:
   a first optical film, disposed adjacent to the first light emitting surface; and
   a second optical film, disposed on a side of the light regulating element away from the second light emitting surface.

5. The light source module according to claim 1, wherein the light regulating element comprises a cholesteric liquid crystal panel.

6. The light source module according to claim 1, wherein the light regulating element comprises a polymer-dispersed liquid crystal film.

7. The light source module according to claim 1, further comprising a control unit, wherein the control unit divides the light regulating element into a plurality of regions and can regulate the plurality of regions to have the same or different reflectivity.

8. The light source module according to claim 1, further comprising:
   a first optical film, disposed adjacent to the first light emitting surface; and
   a second optical film, disposed on a side of the light regulating element away from the second light emitting surface.

9. A light source module, comprising a light guide plate, a light source and a light regulating element, wherein:
   the light guide plate has a first light emitting surface and a second light emitting surface opposite to each other and a light incident surface connected between the first light emitting surface and the second light emitting surface, and the second light emitting surface has a plurality of microstructures;
   the light source is disposed adjacent to the light incident surface and configured to emit a light to enter the light guide plate through the light incident surface;
   the light regulating element is disposed adjacent to the second light emitting surface and configured to receive the light and regulate a reflectance of the light regulating element for the light,
   a first optical film, disposed adjacent to the first light emitting surface; and
   a second optical film, disposed on a side of the light regulating element away from the second light emitting surface,
   wherein each of the plurality of microstructures has a first surface inclined with respect to the second light emitting surface, the first surface faces the light incident surface, the first optical film is a first reverse prism sheet and comprises a plurality of first prism pillars, the plurality of first prism pillars are arranged along a predetermined direction from the light incident surface toward away from the light incident surface, the plurality of first prism pillars face the first light emitting surface, the second optical film is a second reverse prism sheet and comprises a plurality of second prism pillars, the plurality of second prism pillars are arranged along the predetermined direction and face the second light emitting surface.

10. The light source module according to claim 1, further comprising:
    a first optical film, disposed adjacent to the first light emitting surface; and
    a second optical film, disposed between the second light emitting surface and the light regulating element.

11. A light source module, comprising a light guide plate, a light source and a light regulating element, wherein:
    the light guide plate has a first light emitting surface and a second light emitting surface opposite to each other and a light incident surface connected between the first light emitting surface and the second light emitting surface, and the second light emitting surface has a plurality of microstructures;
    the light source is disposed adjacent to the light incident surface and configured to emit a light to enter the light guide plate through the light incident surface;
    the light regulating element is disposed adjacent to the second light emitting surface and configured to receive the light and regulate a reflectance of the light regulating element for the light,
    a first optical film, disposed adjacent to the first light emitting surface; and
    a second optical film, disposed between the second light emitting surface and the light regulating element,
    wherein each of the plurality of microstructures has a first surface inclined with respect to the second light emitting surface, the first surface faces the light incident surface, the first optical film is a first reverse prism sheet, and comprises a plurality of first prism pillars, the plurality of first prism pillars are arranged along a predetermined direction from the light incident surface toward away from the light incident surface, the plurality of first prism pillars face the first light emitting surface, the second optical film is a second reverse prism sheet and comprises a plurality of second prism pillars, the plurality of second prism pillars are arranged along the predetermined direction and face the second light emitting surface.

12. A dual display device, comprising a light source module, a first display panel and a second display panel, wherein:
    the light source module comprises a light guide plate, a light source and a light regulating element, wherein:
    the light guide plate has a first light emitting surface and a second light emitting surface opposite to each other, and a light incident surface connected between the first light emitting surface and the second light emitting surface, and the second light emitting surface has a plurality of microstructures;
    the light source is disposed adjacent to the light incident surface and configured to emit a light beam to enter the light guide plate through the light incident surface; and
    the light regulating element is disposed adjacent to the second light emitting surface and configured to receive the light beam and regulate a reflectance of the light regulating element for the light;
    the first display panel is disposed on a side of the light guide plate facing the first light emitting surface; and
    the second display panel is disposed on a side of the light regulating element that is away from the light guide plate,
    wherein the light regulating element comprises a liquid crystal panel, a first polarizing film, and a second polarizing film, the first polarizing film is disposed on a side of the liquid crystal panel away from the light guide plate, the second polarizing film is disposed on the other side of the liquid crystal panel facing the light guide plate, the first polarizing film has a first transmission axis to allow a light in a direction parallel to a polarization direction of the first transmission axis to pass therethrough and to reflect a light in a direction non-parallel to the polarization direction of the first transmission axis, and the second polarizing film has a second transmission axis to allow a light in a direction parallel to the polarization direction of the second transmission axis to pass therethrough.

* * * * *